United States Patent Office 3,055,937
Patented Sept. 25, 1962

3,055,937
SUBSTITUTED GLYCINEAMIDES
André L. Langis, St. Laurent, Quebec, and Hilda M. McConkey, Montreal, Quebec, Canada, assignors to American Home Products Corporation, New York, N.Y., a corporation of Delaware
No Drawing. Filed Oct. 6, 1960, Ser. No. 60,775
7 Claims. (Cl. 260—559)

This invention relates to new chemical compounds which are useful for producing dilation of the peripheral blood vessels. Our invention is also concerned with a process by which these compounds may be prepared.

Our new chemical compounds, possessing pharmacological activity as dilators of the peripheral blood vessels, may be chemically regarded as derivatives of glycinamide. They may be generically characterized by the following formula

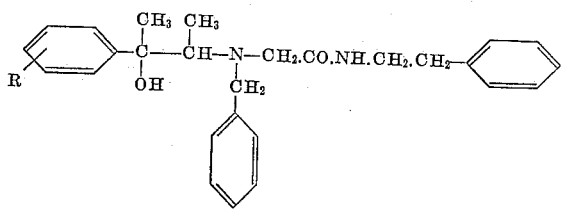

where R is a methoxy. The methoxy group may be present in ortho, meta or para position.

In preparing our novel compounds we prefer to start with a methoxyphenyl benzylamino butanol of the formula

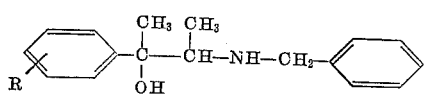

where R, as above, is a methoxy group in ortho, meta or para position. This compound is reacted with N-α-chloracetyl-β-phenethylamine to produce the desired novel compound.

Details of the procedures carried out in the reaction are given in the following illustrative examples. Generally we prefer to bring the methoxyphenyl benzylamino butanol and N-α-chloracetyl-β-phenethylamine together at the temperature of reflux and in the presence of an acid acceptor such as sodium carbonate.

The starting material, 3-benzylamino-2-methoxyphenyl-2-butanol, wherein the methoxy group may be in ortho, meta or para position, may be prepared in accordance with the process described in U.S. Patent No. 2,854,483.

N-α-chloracetyl-β-phenethylamine may be prepared in various ways, as by reacting chloracetyl chloride with phenethylamine following the procedure which is disclosed, for example, in U.S. Patent No. 2,768,166.

Our procedure for the preparation of the novel compounds may be indicated as follows:

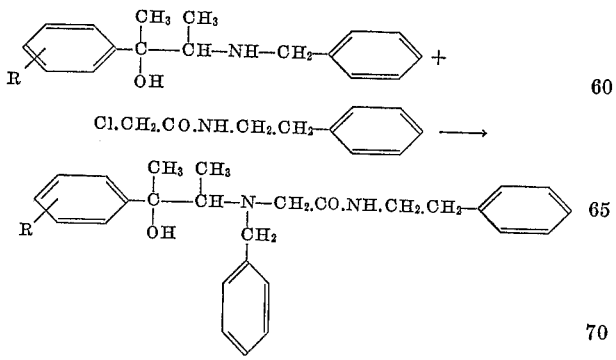

In this diagrammatic representation of the reaction, R represents a methoxy group which may be in ortho, meta or para position on the benzene ring.

Included as pharmacologically active compounds which possess activity in dilating the peripheral blood vessels, in accordance with our invention, are the compounds:

(a) N - 3(o-methoxyphenyl - 2 - butanol - 2)N-benzyl-β-phenethyl glycinamide;
(b) N-3(m-methoxyphenyl - 2 - butanol - 2)N-benzyl-β-phenethyl glycinamide; and
(c) N-3(p-methoxyphenyl - 2 - butanol - 2)N - benzyl-β-phenethyl glycinamide.

Acid addition salts of these compounds, such as the hydrochloride salts, have the advantage of being crystalline and are readily prepared. They possess the same pharmacological activity as the bases.

EXAMPLE 1

N-3(o-Methoxyphenyl-2-Butanol-2)N-Benzyl-β-Phenethyl Glycinamide 5.0 grams (0.015 mole) of o-methoxyphenyl-2-benzylamino-3-butanol-2 and 3.0 grams (0.015 mole) of N-α-chloracetyl-β-phenethylamine in 25 milliliters of butanol were refluxed in the presence of 1.58 grams (0.015 mole) of sodium carbonate for 12 hours. Water was added to dissolve the remaining precipitate and the oil layer separated, washed and dried. Crystallization from ether yielded 2.0 grams of pure material melting at 137–138° C. The product was N-3(o-methoxyphenyl-2-butanol-2)N-benzyl-β-phenethyl glycinamide.

Analysis confirmed the empiric formula $C_{28}H_{34}O_3N_2$.

Ten grams of the above base were converted to the hydrochloride salt by addition of a solution of hydrogen chloride in ether, and the resulting salt was crystallized from hot isopropanol, yielding 8.3 grams of crystalline material melting at 206–207° C.

Analysis confirmed the empiric formula $C_{28}H_{35}O_3N_2Cl$ for the hydrochloride salt.

EXAMPLE 2

N-3(m-Methoxyphenyl-2-Butanol-2)N-Benzyl-β-Phenethyl Glycinamide 10.7 grams (0.034 mole) of m-methoxyphenyl-2-benzylamino-3-butanol-2 and 6.7 grams (0.034 mole) of N-α-chloracetyl-β-phenethylamine in 50 milliliters of butanol were refluxed in the presence of 3.6 grams (0.034 mole) of sodium carbonate for 24 hours. The process then proceeded in the manner described in Example 1, by the addition of water to the reaction mixture, followed by removal, washing and drying of the oil layer which separated. The resulting product, N - 3(m - methoxyphenyl-2-butanol-2)N - benzyl-β-phenethyl glycinamide, did not crystallize despite repeated attempts and was recovered in the form of an oil.

This base, N-3(m-methoxyphenyl - 2-butanol-2)N-benzyl-β-phenethyl glycinamide, was then converted to the hydrochloride salt by the addition of a solution of hydrogen chloride in ether. This hydrochloride salt was then crystallized from mixed isopropanol-ether. The resulting crystalline material, in the amount of 5.0 grams, melted at 105° C., with decomposition.

Analysis confirmed the empiric formula $C_{28}H_{35}O_3N_2Cl$ for the hydrochloride salt.

EXAMPLE 3

N-3(p-Methoxyphenyl-2-Butanol-2)N-Benzyl-β-Phenethyl Glycinamide 5.0 grams (0.015 mole) of p-methoxyphenyl-2-benzylamino-3-butanol-2 and 3.0 grams (0.015 mole) of N-α-chloracetyl-β-phenethyl amine in 25 milliliters of butanol were refluxed with 1.58 grams (0.015 mole) of sodium carbonate for 12 hours. The process was carried out in the manner described in Example 1 to yield 2.0 grams of pure material melting at 118–119° C. The product was N-3(p-methoxyphenyl-2-butanol-2)N-benzyl-β-phenethyl glycinamide.

Analysis confirmed the empiric formula $C_{28}H_{34}O_3N_2$.

The hydrochloride salt of N-3(p-methoxyphenyl-2-butanol-2)N-benzyl-β-phenethyl glycinamide results, as before, by treatment of the base with a solution of hydrogen chloride in ether, followed by recrystallization from a suitable solvent such as isopropanol.

We claim:
1. A compound selected from the group which consists of a substituted glycinamide of the formula

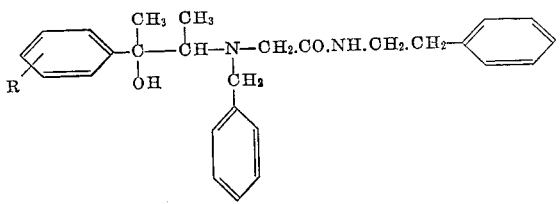

where R represents a methoxy group, and the hydrochloride salts thereof.

2. A compound of the formula

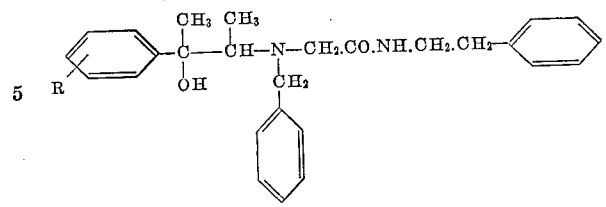

where R represents a methoxy group.

3. N-3(o-methoxyphenyl-2-butanol-2)N-benzyl-β-phenethyl glycinamide.
4. N-3(m-methoxyphenyl-2-butanol-2)N-benzyl-β-phenethyl glycinamide.
5. N-3(p-methoxyphenyl-2-butanol-2)N-benzyl-β-phenethyl glycinamide.
6. The hydrochloride salt of N-3(m-methoxyphenyl-2-butanol-2)N-benzyl-β-phenethyl glycinamide.
7. The hydrochloride salt of N-3(o-methoxyphenyl-2-butanol-2)N-benzyl-β-phenethyl glycinamide.

References Cited in the file of this patent
UNITED STATES PATENTS
2,700,680   Bruce et al. _____ Jan. 25, 1955